(12) United States Patent
Hanssen et al.

US007786203B2

(10) Patent No.: US 7,786,203 B2
(45) Date of Patent: Aug. 31, 2010

(54) POLYMER COMPOSITIONS COMPRISING NUCLEATING OR CLARIFYING AGENTS AND ARTICLES MADE USING SUCH COMPOSITIONS

(75) Inventors: Rob Hanssen, Ghent (BE); Michael B. Barker, Greenville, SC (US); Nathan A. Mehl, Spartanburg, SC (US); Weihua Sonya Wolters, Boiling Springs, SC (US); Sean M. Bernhardt, Greenville, SC (US); Alan T. Radwanski, Simpsonville, SC (US)

(73) Assignee: Milliken & Company, Spartanburg, SC (US)

( * ) Notice: Subject to any disclaimer, the term of this patent is extended or adjusted under 35 U.S.C. 154(b) by 523 days.

(21) Appl. No.: 11/530,061

(22) Filed: Sep. 8, 2006

(65) Prior Publication Data

US 2007/0066733 A1 Mar. 22, 2007

Related U.S. Application Data

(60) Provisional application No. 60/717,645, filed on Sep. 16, 2005, provisional application No. 60/731,224, filed on Oct. 28, 2005.

(51) Int. Cl.
*C08K 5/01* (2006.01)
*C08K 5/09* (2006.01)
*C08K 5/20* (2006.01)

(52) U.S. Cl. ................ 524/394; 524/210; 524/481

(58) Field of Classification Search ............. 524/394, 524/210, 481
See application file for complete search history.

(56) References Cited

U.S. PATENT DOCUMENTS

| | | | |
|---|---|---|---|
| 3,458,604 A | 7/1969 | Palmer | |
| 3,558,551 A | 1/1971 | Gilbert et al. | 260/41 |
| 4,113,721 A | 9/1978 | Hauser et al. | 260/178 |
| 4,375,381 A | 3/1983 | Ross | 525/93 |
| 4,434,264 A * | 2/1984 | Ficker | 524/323 |
| 4,463,113 A | 7/1984 | Nakahara et al. | 524/117 |
| 4,532,280 A * | 7/1985 | Kobayashi et al. | 524/108 |
| 4,588,775 A | 5/1986 | McCullough, Jr. | 525/88 |
| 5,049,605 A | 9/1991 | Rekers | 524/108 |
| 5,082,902 A | 1/1992 | Gurevitch et al. | 525/240 |
| 5,225,466 A | 7/1993 | Akao | |
| 5,284,613 A | 2/1994 | Ali et al. | 264/566 |
| H1301 H * | 4/1994 | Lee et al. | 524/108 |
| 5,342,868 A | 8/1994 | Kimura et al. | 524/108 |
| 5,405,901 A | 4/1995 | Daniell et al. | 525/53 |
| 5,455,092 A | 10/1995 | Tung | |
| 5,494,965 A | 2/1996 | Harlin et al. | 525/52 |
| 5,530,055 A | 6/1996 | Needham | 524/528 |
| 5,891,539 A | 4/1999 | Nakane et al. | 428/36.9 |
| 6,015,854 A * | 1/2000 | McCullough, Jr. | 524/396 |
| 6,124,770 A | 9/2000 | Sakamoto et al. | |
| 6,221,982 B1 | 4/2001 | Debras et al. | 526/64 |
| 6,291,601 B1 | 9/2001 | Debras | 526/64 |
| 6,465,551 B1 | 10/2002 | Zhao et al. | 524/284 |
| 6,485,662 B1 | 11/2002 | Neubauer et al. | 264/169 |
| 6,534,574 B1 | 3/2003 | Zhao et al. | 524/284 |
| 6,547,094 B1 | 4/2003 | Jacobs | 220/839 |
| 6,559,211 B2 * | 5/2003 | Zhao et al. | 524/285 |
| 6,562,890 B2 * | 5/2003 | Dotson | 524/396 |
| 6,569,948 B2 | 5/2003 | Laurent | 525/240 |
| 6,599,964 B2 * | 7/2003 | Jones et al. | 524/108 |
| 6,599,971 B2 | 7/2003 | Dotson et al. | 524/394 |
| 6,632,896 B1 | 10/2003 | Almquist et al. | 526/96 |
| 6,642,323 B1 | 11/2003 | Myhre et al. | 526/64 |
| 6,809,154 B2 | 10/2004 | Lindahl et al. | 525/191 |
| 6,995,202 B2 | 2/2006 | Lake, Jr. et al. | 524/285 |
| 7,052,754 B2 | 5/2006 | Scheelen et al. | 428/36.9 |
| 7,078,450 B2 | 7/2006 | Lake, Jr. et al. | 524/285 |
| 2002/0074682 A1 | 6/2002 | Neubauer | 264/83 |
| 2003/0149162 A1 | 8/2003 | Ahlstrand | 524/495 |
| 2004/0034179 A1 | 2/2004 | Loveday et al. | 528/113 |

FOREIGN PATENT DOCUMENTS

| | | |
|---|---|---|
| DE | 1800695 | 4/1969 |
| DE | 247 410 A1 | 7/1987 |
| EP | 0 598 626 A2 | 11/1993 |
| EP | 0940431 | 9/1999 |
| EP | 1 146 077 A1 | 4/2000 |
| EP | 1 591 475 A1 | 11/2005 |
| JP | 10-081795 | 3/1998 |
| JP | 10 81795 A | 3/1998 |
| WO | WO 00/04088 | 1/2000 |
| WO | WO 00/04089 | 1/2000 |
| WO | WO 2004/072168 | 8/2004 |
| WO | WO 2005/06387 | 1/2005 |
| WO | WO 2005/047383 A1 | 5/2005 |
| WO | WO 2006/083640 A1 | 8/2006 |

OTHER PUBLICATIONS

Journal of Applied Polymer Science, vol. 66, 2481-2493 (1997). Rheological and Calorimetric Evidences of the Fractionated Crystallization of iPP Dispersed in Ethylene / a-Olefin Copolymers. A.C. Manaure, R.A. Morales, J.J. Sanchez, A.J. Muller. Received Feb. 5, 1997; accepted Jun. 26, 1997.

(Continued)

*Primary Examiner*—Kriellion A Sanders
(74) *Attorney, Agent, or Firm*—Robert M. Lanning (57) ABSTRACT

A polymer composition comprises a polyolefin and a nucleating or clarifying agent dispersed or dissolved in the polyolefin. Methods for producing the polymer composition and method for producing articles from the polymer composition are also described. Molded polymer articles and polymer film may be manufactured using the compositions of the invention.

6 Claims, 2 Drawing Sheets

OTHER PUBLICATIONS

Die Angewandte Makromolekulare Chemie 74 (1978) 1-15 (Nr. 1146). Deutsches Kunststoff-Institut, D-61 Darmstadt. Farbpigmente als Nukleierungsmittel fur teilkristalline Polymere. Uwe Johnsen und Karl-Heinz Moos (Eingegangen am May 8, 1978). Herrn Prof. Dr. Dr. h.c. Heinrich Hellmann zum 65. Geburtstag gewidmet.

Macromol. Chem. Phys. 201, 958-972 (2000). Nucleation and crystallization of blends of poly(propylene) and ethylene/a-olefin copolymers. A.C. Manaure, A.J. Muller. Received: Jul. 1, 1999; revised: Aug. 10, 1999.

Heterogeneous nucleation in the crystallization of polyolefins: Part 1. Chemical and physical nature of nucleating agents. F.L. Binsbergen.

Nucleating Agents for Semicrystalline Polymers, "Plastics Additives Handbook," (H. Zweifel Ed.), Hanser, Munich (2001). (Jenci Kurja and Nathan Mehl).

Milliken Pending Application. U.S. Appl. No. 11/199,642, (Milliken file 5832) applicant—Lambert et al., filed Aug. 9, 2005. Title: "Film and method of making film".

* cited by examiner

POLYMER COMPOSITIONS COMPRISING NUCLEATING OR CLARIFYING AGENTS AND ARTICLES MADE USING SUCH COMPOSITIONS

CROSS REFERENCE TO RELATED APPLICATIONS

This application claims priority to U.S. provisional application Ser. No. 60/717,645 which was filed in the United States Patent and Trademark Office on Sep. 16, 2005; and to U.S. provisional application Ser. No. 60/731,224 filed in the United States on Oct. 28, 2005.

FIELD OF THE INVENTION

The invention is directed to polymer compositions comprising nucleating or clarifying agents. The invention further provides methods for making and using such polymer compositions.

BACKGROUND OF THE INVENTION

There is a need in the industry for improved polyolefins, including particularly polyethylene. Polyethylene is useful for the manufacture of a variety of articles, including molded articles, films, and other structures. Improved polymeric articles may provide certain desired optical properties such as reduced haze or increased clarity. Such articles are made by applying nucleating or clarifying agents and perhaps other additives in the polymer prior to manufacture of articles using the improved polymer. Improved mechanical properties of such polymers also are desirable.

Polymer compositions may be rendered molten for manufacture into a wide variety of articles. Such articles may include films, fibers, and various types of molded articles. Various polymer processing techniques are known, including extrusion, blowing, molding, compression, and injection, in which the molten polymer is cooled and shaped into a solid mass. Each process has its own particular physical and chemical effects upon the polymer. Further, each process is customized to achieve exactly the performance required from the polymer, using the least amount of energy, and at the maximum rate of production. In general, the use of one compound or formula in one type of polymer processing technique does not predict success using the same formula in another type of processing technique. Extensive trial and experimentation is needed to determine that a particular formulation is or is not suitable for a particular type of polymer process.

Thermoplastic compositions must exhibit certain physical characteristics to facilitate widespread use. Specifically within polyolefins, for example, uniformity in arrangement of crystals upon crystallization is sometimes necessary to provide an effective, durable, and versatile polyolefin article. To achieve desirable physical properties, certain compounds and compositions can be employed to provide nucleation sites for polyolefin crystal growth during molding or fabrication. Nucleating agents are known to modify the crystalline structure of thermoplastic polymers.

The use of nucleating agents may increase the temperature and the rate of crystallization. Compositions containing such nucleating compounds crystallize at a much faster rate than non-nucleated polyolefins. Crystallization at higher temperatures results in reduced fabrication cycle times and a variety of improvements in physical properties such as stiffness.

Nucleating agents provide nucleation sites for crystal growth during cooling of a thermoplastic molten formulation. The presence of such nucleation sites results in a larger number of smaller crystals. As a result of the smaller crystals formed therein, clarification of the target thermoplastic may be achieved. However, excellent clarity is not always a result. The more uniform (and smaller) the crystal size, the less light is scattered. Thus, the clarity of the thermoplastic article itself may be improved. Thus, thermoplastic nucleator compounds are important to the industry, as they may provide enhanced clarity, improved physical properties, and faster processing.

Extrusion of polymer is a common manner of making extruded plastic articles. Other processes, however, are known for processing polymers. Processing techniques, temperatures, and the like vary greatly among various types of polymer processing techniques. In general, it is not predictable or certain that any particular formulation used in one type of processing (such as extrusion) could apply or work in a different type of polymer processing technique, using different temperatures, mechanical processing methods, cure times and the like. Further, each type of polymer and each nucleating agent itself provides unique properties. It is not predictable that an additive or procedure used with one type of polymer would perform satisfactorily with another polymer.

BRIEF DESCRIPTION OF THE DRAWINGS

FIGS. 1-4 correspond to examples 8A-8D in the example section herein.

SUMMARY OF THE INVENTION

The invention broadly pertains to polymer compositions comprising a polyolefin matrix and a nucleating or clarifying agent dispersed or dissolved in the matrix. In certain embodiments, the invention pertains to polymer compositions comprising polyethylene and a nucleating or clarifying agent dispersed or dissolved in the polyethylene matrix. In another embodiment, the polymer composition contains at least one additive, such as for example a second polyolefin, in addition to the nucleating and/or clarifying agent. The invention further provides methods for producing the polymer composition of the invention and articles made from the polymer compositions of the invention.

DETAILED DESCRIPTION OF THE INVENTION

The invention pertains to polymer compositions comprising a polyolefin matrix (e.g., a polyethylene matrix) and a nucleating and/or clarifying agent dispersed or dissolved in the matrix. The polyethylene forming the matrix of certain embodiments of the polymer composition can be any suitable polyethylene. For example, the matrix can be comprised of low density polyethylene (LDPE), linear low density polyethylene (LLDPE), medium density polyethylene (MDPE), high density polyethylene (HDPE), or any combination. Polyethylene with density in the in the range of 0.910 to 0.980 g/cc may be particularly desirable. Further, the invention also is directed to the manufacture of molded articles, sheets, or films, using such compositions. Blown or cast film can be manufactured using such compositions. Injection molded polymer parts also can be manufactured using the compositions of the invention.

Nucleating or Clarifying Agents

The nucleating and/or clarifying agent contained in the polymer composition can be any suitable nucleating and/or clarifying agent. For example, suitable nucleating and/or clarifying agents include, but are not limited to, benzoic acid salts, substituted benzoic acid salts, bicyclic dicarboxylate metal salts, hexahydrophthalic acid metal salts, di-acetal derivatives such as sorbitol acetals, phosphate ester salts, glycerolate salts, di-, tri-, and tetra-amides, pine rosin derivatives, talc, pigments, and combinations thereof. Benzoic acid salts suitable for use as the nucleating and/or clarifying agent include, but are not limited to sodium benzoate, lithium benzoate, aluminum para-tertiary butyl benzoate, and combinations thereof.

There are other nucleating agents that may be used as well. A nucleating agent may be identified as any material that effectively accelerates the phase change from liquid polymer to semi-crystalline polymer (evident via faster crystallization rates measured with a differential scanning calorimeter or small crystallites observed with an optical microscope). Examples of such nucleating agents are 2,6-naphthalene dicarboxamides, aliphatic mono- and di-carboxylate salts such as calcium pimelate and calcium suberate, and polymeric nucleating agents such as polyvinylcyclohexane, high crystallinity polypropylenes (HCPPs), and branched polypropylenes.

When the nucleating agent is a polymeric nucleating agent, the suitable use level is higher. In such embodiments, the additive typically is present within the composition in an amount of about 100,000 ppm or less, about 50,000 ppm or less, about 25,000 ppm or less, or about 20,000 ppm or less.

In the practice of the invention, an additional additive may be used, as further described herein. This additional additive may be selected from the group consisting of: a second polyolefin, stearyldiethanolamine, alkoxylated meta-toluidine compounds, poly(ethylene glycol), poly(ethylene glycol) derivatives, copolymers containing segments of ethylene oxide, polyalcohols and their derivatives, blockcopolymers containing at least one block of a polyalcohol, polycaprolactone derivatives and their copolymers, polyesters based on aliphatic di-alcohols and aliphatic di-carboxylic acids as well as copolymers of these polyesters, polycarbonate derivatives and their copolymers.

Phosphate esters suitable for use as the nucleating and/or clarifying agent include, but are not limited to, sodium 2,2'-methylene-bis-(4,6-di-tert-butylphenyl)phosphate (from Asahi Denka Kogyo K. K., known as "NA-11™"), aluminum hydroxy bis[2,2'-methylene-bis-(4,6-di-tert-butylphenyl)phosphate] (from Asahi Denka Kogyo K. K., known as "NA-21™"), and other such phosphate esters as disclosed for example in U.S. Pat. Nos. 5,342,868 and 4,463,113.

Bicyclic dicarboxylate metal salts suitable for use as the nucleating and/or clarifying agent include, but are not limited to, those salts described in U.S. Pat. Nos. 6,465,551 and 6,534,574. The bicyclic salts having the structure shown below:

wherein $M_1$ and $M_2$ are independently selected from the group consisting of: sodium, calcium, strontium, lithium, zinc, magnesium, and monobasic aluminum;

wherein $R_1$, $R_2$, $R_3$, $R_4$, $R_5$, $R_6$, $R_7$, $R_8$, $R_9$, and $R_{10}$ are independently selected from the group consisting of: hydrogen and $C_1$-$C_9$ alkyls; and further wherein any two adjacently positioned $R_3$-$R_{10}$ alkyl groups optionally may be combined to form a carbocyclic ring. In particular, suitable bicyclic dicarboxylate metal salts include disodium bicyclo[2.2.1]heptane-2,3-dicarboxylate, calcium bicyclo[2.2.1]heptane-2,3-dicarboxylate, and combinations thereof. One may employ HYPERFORM® HPN-68 or HPN-68L from Milliken & Company of Spartanburg, S.C. HPN-68L is commercially sold, and comprises the disodium bicyclo[2.2.1]heptane-2,3-dicarboxylate, as shown below:

This compound may be employed in examples of the invention, as in Example 3 below.

Compounds and compositions comprising specific metal salts of hexahydrophthalic acid (HHPA) may be employed in general to provide highly desirable properties within thermoplastic articles are provided. The inventive HHPA derivatives are useful as nucleating and/or clarifying agents for such thermoplastics, are practical and easy to handle. Such compounds, when added to the thermoplastic provide good (and sometimes excellent) crystallization temperatures, stiffness, and acid scavenger compatibility. A film or injection molded article is disclosed of a polyethylene and a cycloaliphatic metal salt. Such compounds may be as shown:

wherein $M_1$ and $M_2$ are the same or different, and may be combined into one cation, and are selected from at least one metal cation of calcium, strontium, lithium, and monobasic aluminum; and wherein $R_1, R_2, R_3, R_4, R_5, R_6, R_7, R_8, R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. In one preferred embodiment, the $M_1$ and $M_2$ are combined as a calcium ion. Ca HHPA as referred to herein refers to the following compound;

Ca HHPA

Di-acetal derivatives suitable for use as the nucleating and/or clarifying agent include, but are not limited to, alditol acetals, such as the sorbitol di-acetals described in U.S. Pat. No. 5,049,605. Suitable di-acetal derivatives preferably conform to the formula In formula (I), n typically is a value selected from 0, 1, or 2. R typically is selected from the group consisting of hydrogen, alkenyl (such as allyl), alkyl, alkoxy, hydroxylalkyl, alkylhalide, aromatic and substituted aromatic groups. $R_1, R_2, R_3, R_4, R_5, R_6, R_7, R_8, R_9$, and $R_{10}$ typically are independently selected from the group consisting of hydrogen, fluorocarbons, alkenyl, alkyl, alkynyl, alkoxy, carboxy, halides, amino, thioether and aromatic groups. In certain embodiments, any two adjacent groups selected from $R_1, R_2, R_3, R_4, R_5, R_6, R_7, R_8, R_9$, and $R_{10}$ may be combined to form a cyclic group selected from the group consisting of methylenedioxy, cyclopentyl, cyclohexyl, or other similar cyclic groups. In certain embodiments, the nucleating or clarifying agent preferably is 1,3:2,4-bis(3,4-dimethylbenzylidene) sorbitol (hereinafter DMDBS), available from Milliken Chemical under the trade name Millad® 3988.

Di-, tri-, and tetra-amides suitable for use as the nucleating and/or clarifying agent include, but are not limited to: di- and tri-amides containing amide cores comprised of either single and fused 4,5,6,7-membered aromatic or cycloaliphatic rings; di- and tri-amides containing amide cores comprised of di and tri aliphatic carboxylic acids or di and tri aliphatic amines; and tri- and tetra-amides containing amide cores comprised of aliphatic tri- and tetracarboxylic acids and aliphatic or cycloaliphatic amines. These compounds are exemplified in patent publications, including WO 2004072168, EP 0940431, and WO 200506387.

The nucleating or clarifying agent can be present in the polymer composition in any suitable amount. Typically, the nucleating and/or clarifying agent is present within the composition in an amount sufficient to observably increase the crystallization temperature of the polyolefin forming the matrix (e.g., polyethylene) or in an amount sufficient to change the measured optical properties of the polymer composition relative to the optical properties of the virgin polyolefin forming the matrix. For example, when the polyolefin forming the matrix is polyethylene, the nucleating and/or clarifying agent can be present within the polymer composition in an amount sufficient to decrease the measured haze, increase the measured gloss, or increase the measured clarity of the polymer composition relative to the virgin polyethylene. Typically, the nucleating and/or clarifying agent is present in the polymer composition in an amount of about 0.1 parts per million (ppm) or more, of about 1 ppm or more, about 5 ppm or more, or about 10 ppm or more, based on the weight of the nucleating and/or clarifying agent and the total weight of the polymer composition. In such embodiments, the nucleating and/or clarifying agent typically is present in the polymer composition in an amount of about 10,000 ppm or less, about 5,000 ppm or less, or about 1,000 ppm or less. In those embodiments in which the polymer composition comprises two or more nucleating and/or clarifying agents, each nucleating and/or clarifying agent can be present within the composition in an amount falling within one of the ranges set forth above or, alternatively, the total amount of nucleating and/or clarifying agents contained within the composition can fall within one of the ranges set forth above.

The Use of a Second Additive

As noted above, the polymer composition can comprise at least one additional additive in addition to the polyolefin forming the matrix and the nucleating and/or clarifying agent dispersed or dissolved within the matrix. The additive can be any suitable additive that improves the nucleation and/or clarifying effects attributable to the nucleating and/or clarifying agent; however, a suitable additive need not exhibit such improvements in the nucleation and/or clarifying effects. In certain embodiments, the additive can be an additional nucleating and/or clarifying agent, but in other embodiments, it is not.

In the practice of the invention, an additional additive may be used. Examples include, but are not limited to, the following: a second polyolefin, stearyldiethanolamine, alkoxylated meta-toluidine compounds, poly(ethylene glycol), poly(ethylene glycol) derivatives, copolymers containing segments of ethylene oxide, polyalcohols and their derivatives, blockcopolymers containing at least one block of a polyalcohol, polycaprolactone derivatives and their copolymers, polyesters based on aliphatic di-alcohols and aliphatic di-carboxylic acids as well as copolymers of these polyesters, polycarbonate derivatives and their copolymers.

Additives suitable for use in the polymer composition include, but are not limited to, polyolefins (e.g., a polyolefin other than polyethylene when the polyolefin forming the matrix is polyethylene), stearyldiethanolamine, alkoxylated meta-toluidine compounds, polyethylene glycols (including simple PEGs and ether and ester derivatives), copolymers of ethylene oxide and propylene oxide (e.g., block copolymers of ethylene oxide and propylene oxide), and combinations thereof.

Alkoxylated meta-toluidine compounds suitable for use as the additive include, but are not limited to, those compounds described in U.S. Pat. No. 4,113,721, as well as those alkoxylated meta-toluidine compounds that can be produced in accordance with, for example, Preparation I of U.S. Pat. No. 4,113,721. For example, suitable alkoxylated meta-toluidine compounds include, but are not limited to, meta-toluidine 2EO 10PO 6EO, meta-toluidine 16EO 10PO, and meta-toluidine 2EO 14PO 8EO, wherein EO represents an ethylene oxide residue and PO represents a propylene oxide residue. Each of these compounds can be produced in accordance with the method outlined in Preparation I of U.S. Pat. No. 4,113,721 using N,N-dihydroxyethyl-m-toluidine and the appropriate molar equivalent amounts of ethylene oxide and propylene oxide.

As noted above, the additive can be a second polyolefin or other suitable olefin copolymer. For example, when the polyolefin forming the matrix is polyethylene, the additive can be polypropylene. In certain such embodiments, the second polyolefin (e.g., polypropylene) can be used as a carrier for the nucleating and/or clarifying agent(s). In particular, the nucleating and/or clarifying agents can be compounded into the polyolefin (e.g., polypropylene) to form a masterbatch, which can then be added to the polyolefin forming the matrix. Furthermore, while not wishing to be bound to any particular theory, it is believed that the second polyolefin (e.g., polyproplylene) can act as nucleating and/or clarifying agent for the polyolefin forming the matrix. In such an embodiment, the second polyolefin (e.g., polypropylene) may be used in place of the previously described nucleating and/or clarifying agents. Thus, in these embodiments, the polymer composition comprises a first polyolefin (e.g., polyethylene) forming a matrix and a second polyolefin (e.g., polypropylene), which acts as a nucleating and/or clarifying agent for the first polyolefin, dispersed therein.

The additive(s) can be present within the polymer composition in any suitable amount. Typically, the additive(s) is present in the polymer composition in an amount sufficient to improve the nucleation and/or clarifying effects attributable to the nucleating and/or clarifying agent(s); however, the additive(s) need not be present in such an amount. In certain embodiments, such as when the additive is a second polyolefin (e.g., polypropylene), the additive can be present within the polymer composition in an amount of about 100 ppm or more, about 1,000 ppm or more, about 1,500 ppm or more, about 2,000 ppm or more, or about 2,500 ppm or more (based on the weight of the additive and the total weight of the polymer composition). In such embodiments, the additive typically is present within the composition in an amount of about 100,000 ppm or less, about 50,000 ppm or less, about 25,000 ppm or less, or about 20,000 ppm or less.

In other embodiments, the additive typically is present in the composition in an amount of about 0.1 ppm or more, about 0.5 ppm or more, or about 1 ppm or more. In those embodiments in which the polymer composition comprises two or more additives, each additive can be present within the composition in an amount falling within one of the ranges set forth above or, alternatively, the total amount of additives contained within the composition can fall within one of the ranges set forth above.

The polymer composition of the invention can be produced by any suitable method. For example, the polymer composition can be produced by adding the nucleating and/or clarifying agent and any additional additives to a melt containing the polyolefin forming the matrix of the polymer composition. Alternatively, the nucleating and/or clarifying agent and any additional additives can be blended in dry form with a masterbatch containing the polyolefin forming the matrix, which blend is then further processed to produce the polymer composition. In yet another embodiment, such as when the additive is a second polyolefin (e.g., polypropylene), the nucleating and/or clarifying agent and the second polyolefin can be combined to form a masterbatch, which is then blended with another masterbatch containing the polyolefin forming the matrix. In this embodiment, the blend of masterbatches is then further processed to produce the polymer composition.

Product Applications

It is believed that the polymer composition of the invention will be particularly well suited for use in the molding polyolefin-containing articles. For example, it is believed that the polymer composition of the invention will be particular well suited for use in injection molding processes, injection blow molding processes, extrusion blow molding, rotational molding, as well as other molding processes. While not wishing to be bound to any particular theory, it is believed that the more rapid nucleation of certain polymer compositions of the invention, as evidenced by an increase in the crystallization temperature of, for example, a polymer composition containing polyethylene, will lessen the amount of time that an article made from the polymer composition must be allowed to cool before it is removed from the mold. It is also believed that this more rapid nucleation of certain polymer compositions of the invention may lessen the time needed to cool a container before it is trimmed, as the container must be allowed to cool before trimming.

Polyolefins Employed

The term polyolefin or polyolefin resin as used herein is intended to encompass any materials comprised of at least one polyolefin. Examples include polyethylene, isotactic and syndiotactic polypropylene, poly(4-methyl)pentene, polybutylene, and any blends or copolymers thereof, whether high or low density in composition. The polyolefin polymers of the present invention may include aliphatic polyolefins and copolymers made from at least one aliphatic olefin and one or more ethylenically unsaturated co-monomers. The polyethylene (PE) matrix can be comprised of low density polyethylene (LDPE), linear low density polyethylene (LLDPE), medium density polyethylene (MDPE), high density polyethylene (HDPE), or any combination thereof. Further, the invention also is directed to the manufacture of molded articles, or films, using such compositions. Blown or cast film can be manufactured using such compositions. Injection molded polymer parts also can be manufactured using the compositions of the invention.

Bimodal polymers are also useful in the invention, as indicated in Example 11 below, although examples herein are not limiting in the ways in which the invention can be practiced with bimodal polyethylene. "Bimodal" refers generally to a polymer that comprises at least two components, one of which has a relatively low molecular weight and another of which has a relatively high molecular weight. Such bimodal resins may be made by blending two polymers of different molecular weight, or alternately, are commonly made in a multistage process of manufacture. For example, such bimodal polymers may be manufactured in a single reactor using a catalyst system or mixture with two or more different catalytic sites, or by using multiple reactors in a staged process. Comonomer is often added to bimodal polyethylene to adjust resin properties. The comonomers can be added to the low molecular weight component or the high molecular weight component. It is sometimes desirable to add a minimal amount of comonomer to the low molecular weight component.

Bimodal polyethylene may be very useful in the practice of the invention, as shown in Example 11 herein.

Furthermore, the improvements in optical properties observed for certain polymer compositions of the invention may also permit articles having certain desired optical properties (e.g., reduced haze and increased clarity) to be produced using polyolefins and/or processes not previously capable of yielding articles exhibiting these desired optical properties.

Injection molding (IM) produces a variety of parts by injecting a molten polymer into a clamped mold and held until the polymer has solidified. Parts must remain in the mold until solid enough to withstand part ejection and downstream activities. Part ejection in injection molds involves air, mechanical, or a combination of both to remove the final part from the mold.

Reduction of cycle time in injection molding is limited to solidification of the polymer in the mold. Generally, the most significant portion of an injection molding cycle is the cooling time. If a part is ejected from a mold too soon, the soft part may experience warpage caused by varied shrinkage forces. This may result in undesirable sticking in the mold, and also inconsistent part quality.

Extrusion blow molding (EBM) produces typically a hollow container by extruding a parison before being inflated and trimmed to its final shape. The hollow container may be ejected from the mold when the part has solidified enough to withstand downstream activities. Generally parts are transferred for final part trimming, post-trimming, and final article processing.

Cycle time reduction in EBM can be associated with a reduction in blow time. If the blow time is shortened, the mold may open and eject the part at a faster rate overall increasing the processing speed and productivity of the machine. Typically, reduction of blow time is difficult due to polymer solidification. A soft polymer will have difficulty in: sticking in the mold, post-trimming, and withstanding shrinkage forces that lead to warpage.

Injection blow molding (IBM) is a combination of injection and blow molding. In the first stage, a molten polymer is injected into a mold that preforms the polymer into a test tube like shape. After experiencing minor cooling, the "preform" is transferred to a blow mold for inflation to the final part shape. Finally, the part is ejected for additional downstream operations. The polymer must stay within each stage until the polymer can resist the transferring to the final stage. As with EBM and IM, cycle time reductions may be limited by polymer solidification. Any reduction in cooling, or curing, time may lead to off-quality parts. Limitations in cycle may be material sagging, warpage, sticking in the mold, and the like.

Rotational molding is a process by which polymer pellets or finely ground polymer is loaded into a mold that is heated as it is rotated slowly on both the horizontal and vertical axes. The simultaneous heating and rotation distributes the polymer onto the inner surfaces of the mold where the polymer fuses to form an interconnected object.

The polymer compositions can be used in the molding of polyolefin-containing articles using methods well known in the art. For example, the polymer composition of the invention can be utilized in a typical injection molding, injection blow molding process, or extrusion blow molding process. In such processes, the polyolefin forming the matrix, the nucleating and/or clarifying agent(s), and any additional additives, can be blended in dry form prior to being introduced into the molding apparatus. Alternatively, such as when the additive is a second polyolefin (e.g., polypropylene), the nucleating and/or clarifying agent(s) and the polyolefin can be compounded into a masterbatch, which is then blended with the polyolefin forming the matrix (e.g., polyethylene). This blend can then be fed into the molding apparatus.

The following examples further illustrate the invention but, of course, should not be construed as in any way limiting its scope.

EXAMPLE 1

This example demonstrates the changes in thermal and optical properties exhibited by the polymer compositions described herein. Four samples (1A-1D) were prepared using four commercially available polyethylene resins compounded with approximately 2.0% by weight (based on the total weight of the polymer composition) of a masterbatch containing approximately 10% by weight (based on the total weight of the masterbatch) of a commercially available 1,3:2,4-bis(3,4-dimethylbenzylidene) sorbitol nucleating agent (MILLAD® 3988 available from Milliken Chemical) and approximately 90% by weight (based on the total weight of the masterbatch) of random copolymer polypropylene. Thus, each of the compounded polymer compositions comprised 0.2% by weight of the 1,3:2,4-bis(3,4-dimethylbenzylidene) sorbitol nucleating agent and 1.8% by weight of the random copolymer polypropylene.

The compounded samples were injection molded into 50 mil plaques using an Arburg 40-ton injection-molding machine. After storing the molded plaques for at least 12 hours, the plaques were tested for haze and clarity using a BYK-Gardner Haze-Gard Plus, gloss by a BYK Gardner Gloss Meter, and change in crystallization temperature using a Perkin-Elmer DSC 7. The following tables list the different resin samples evaluated.

TABLE 1

Melt flow rates and density measurements for Samples 1A-1D.

| Sample | Resin Type | MI (g/10 min) | Density (g/cc) |
|---|---|---|---|
| 1A | LDPE | 24 | 0.921 |
| 1B | LLDPE | 25 | 0.917 |
| 1C | HDPE | 20 | 0.955 |
| 1D | HDPE | 19 | 0.952 |

The nucleation of the polyethylene resin provided by the addition of the masterbatch is demonstrated by the change in optical properties and increased crystallization temperature, as set forth in Table 2 below. In particular, the table compares various optical and physical properties of Samples 1A-1D as compared to the corresponding virgin polyethylene resin, which are designated as "Control."

TABLE 2

Optical and physical properties of Samples 1A-1D.

| Sample | Resin Type | Haze (%) | Clarity (%) | Tc (° C.) |
|---|---|---|---|---|
| 1A Control | LDPE | 62.0 | 97.3 | 90.7 |
| 1A | LDPE | 36.2 | 97.3 | 93.4 |
| 1B Control | LLDPE | 92.6 | 95.2 | 100.6 |
| 1B | LLDPE | 68.3 | 96.3 | 108.6 |
| 1C Control | HDPE | 100 | 5.5 | 109.4 |
| 1C | HDPE | 100 | 79.5 | 111.5 |

TABLE 2-continued

Optical and physical properties of Samples 1A-1D.

| Sample | Resin Type | Haze (%) | Clarity (%) | Tc (° C.) |
|---|---|---|---|---|
| 1D Control | HDPE | 99.1 | 70.4 | 109.1 |
| 1D | HDPE | 88.7 | 94.9 | 109.8 |

As evidenced by the data set forth in Table 2, each of Samples 1A-1D exhibited equal or lower haze, equal or higher clarity, and an increased crystallization temperature as compared to the virgin resin.

EXAMPLE 2

Manufacture of Cups

A series of cups with an average weight of approximately 20 g and a nominal wall thickness of 25 mils (0.025 inch) were produced using a Husky S-90 injection molding machine. The polymer compositions used to produce the samples contained approximately 2% by weight (based on the total weight of the composition) of the masterbatch described in Example 1 along with 2% by weight of masterbatches described in Example 9.

EXAMPLE 3

A third set of cups (Samples 3A-3B) were produced by the same method as in Example 2. The polymer compositions used to produce the cups included a control (Sample 3A) comprising a commercially available HDPE resin and a polymer composition according to the invention (Sample 3B) comprising the same HDPE resin and 2.5% by weight (based to the total weight of the polymer composition) of a masterbatch comprising 4% by weight (based on the total weight of the masterbatch) of a commercially available disodium bicyclo[2.2.1]heptane-2,3-dicarboxylate nucleating agent (HYPERFORM® HPN-68L available from Milliken Chemical) and 96% by weight of a homopolymer polypropylene.

After at least 12 hours of storage, the samples were evaluated to determine haze and clarity using a BYK Gardner Haze-Gard Plus.

TABLE 4

Optical properties of Samples 3A-3B.

| Sample | Haze (%) | Clarity (%) |
|---|---|---|
| 3A | 94.5 | 67.6 |
| 3B | 56.4 | 97.7 |

As can be seen from the data set forth in Table 4, the cups produced using the polymer composition of the invention exhibited lower haze and increased clarity relative to the cups produced using the virgin resin.

EXAMPLE 4

Five sets of 50 mil plaques (Samples 4A-4E), each set containing 10 plaques, were injection-molded at 160° C. barrel and 21° C. mold temperatures using an Arburg 40-ton injection-molding machine. Each sample comprised a commercially available high density polyethylene resin having a melt flow rate of approximately 19 g/10 min and a density of approximately 0.952 g/cm$^3$. Sample 4A was the control containing only the HDPE resin. Samples 4B and 4C also comprised 0.2% by weight and 2.0% by weight (based on the total weight of the polymer composition), respectively, of the masterbatch described in Example 1. Samples 4D and 4E comprised 0.2% by weight and 2.0% by weight (based on the total weight of the polymer composition), respectively, of a masterbatch comprising 5% by weight (based on the total weight of the masterbatch) of a commercially available disodium bicyclo[2.2.1]heptane-2,3-dicarboxylate nucleating agent (HYPERFORM® HPN-68L available from Milliken Chemical), 45% by weight of an impact copolymer polypropylene, and 50% by weight calcium carbonate.

The plaques were tested for haze and clarity using a BYK-Gardner Haze-Gard Plus, gloss by a BYK Gardner Gloss Meter, and crystallization temperature using a Perkin-Elmer DSC 7. The peak crystallization temperature of the resulting polymer compositions, Tc, was measured using 20 mil thick polymer sections of the samples that were heated from 50° C. to 220° C. at 20° C./min, held for 2 min. at 220° C., and then cooled at 20° C./min to 50° C. For measurements of Tc using the 160° C. method, the 20 mil thick samples were heated from 50° C. to 160° C. at 20° C./min, held for 1 min. at 160° C., and then cooled at 20° C./min to 50° C. The standard error in the measurement of Peak Tc by either method is +/−0.2° C.

TABLE 5

Haze, gloss, clarity, and crystallization temperature measurements for Samples 4A-4E.

| Sample | Haze (%) | Gloss | Clarity (%) | Tc (° C.) | Tc (° C.) (160° C. method) |
|---|---|---|---|---|---|
| 4A | 99.1 | 68.2 | 70.4 | 114.3 | — |
| 4B | 100.0 | 67.3 | 36.5 | 114.0 | 114.6 |
| 4C | 88.7 | 68.1 | 94.9 | 115.0 | 116.3/117.0 |
| 4D | 97.3 | 70.3 | 81.1 | 115.6 | 117.3 |
| 4E | 100.0 | 46.7 | 51.0 | 117.0 | 118.6 |

As evidenced by the data set forth in Table 5, the peak crystallization temperatures of Samples 4C, 4D, and 4E are significantly higher than the crystallization temperature of Sample 4A. The additives used in samples 4C, 4D, and 4E are effective nucleating agents for HDPE. In addition, for samples 4C, 4D, and 4E, the peak crystallization temperatures using the 160° C. method are also higher than the peak crystallization temperature of the control sample 4A and the peak crystallization temperature of samples 4C, 4D, and 4E. When the peak crystallization temperature is measured using the 160° C. method, the polypropylene added via the masterbatch does not melt to any significant extent. It appears that the polypropylene content in samples 4C, 4D, and 4E enhances the nucleation efficiency of the additives used in samples 4C, 4D, and 4E.

EXAMPLE 5

Twenty-eight sets of test bars were molded on an Arburg 40-ton injection-molding machine using 230° C. barrel and 25° C. mold temperatures. Each control test bar was produced using a polymer composition comprising a commercially available high density polyethylene resin having a melt flow rate of approximately 19 g/10 min and a density of approximately 0.952 g/cm$^3$. The polymer composition used to produce fourteen of the invention test bars further comprised approximately 1% by weight of a masterbatch comprising 5% by weight (based on the total weight of the masterbatch) of a commercially available disodium bicyclo[2.2.1]heptane-2,3-dicarboxylate nucleating agent (HYPERFORM® HPN-68L available from Milliken Chemical) and 45% by weight of an impact copolymer polypropylene, and 50% by weight calcium carbonate.

The resulting bars were each tested to determine their flexural modulus, using a MTS Universal testing machine with a three point bend fixture, at regimented times after being ejected from the injection-molding machine (shown as storage time in table). In particular, two bars, one of which was a control produced from the virgin HDPE resin and the second of which was produced using the polymer composition according to the invention, were tested at approximately the same interval after being ejected from the injection-molding machine to determine any differences in flexural modulus exhibited by the bars.

TABLE 6

Flexural modulus of HDPE test bars at various storage times.

| Storage Time (min) | Control Flex Mod (MPa) | Invention Flex Mod (MPa) |
| --- | --- | --- |
| 0.5 | 171.09 | 204.65 |
| 1.0 | 221.46 | 271.90 |
| 1.5 | 276.77 | 339.23 |
| 2.0 | 311.19 | 416.08 |
| 2.5 | 361.08 | 468.63 |
| 3.0 | 412.11 | 480.86 |
| 3.5 | 418.92 | 507.77 |
| 4.0 | 444.67 | 529.35 |
| 5.0 | 490.19 | 572.89 |
| 6.0 | 544.52 | 581.63 |
| 7.0 | 562.67 | 638.41 |
| 8.0 | 587.60 | 639.99 |
| 9.0 | 608.43 | 632.72 |
| 10.0 | 610.07 | 654.87 |

As evidenced by the data set forth in Table 6, the bars produced using the polymer composition of the invention consistently exhibited an increased flexural modulus relative to a similar bar produced using the virgin HDPE resin.

EXAMPLE 6

Three sets of 1-liter HDPE bottles (Samples 6A-6C) were produced on a WMB 4 100-16 extrusion blow-molding machine. Each sample was produced from a polymer composition comprising a commercially available HDPE resin exhibiting a melt flow rate of approximately 0.89 g/10 min and a density of approximately 0.958 g/cm$^3$. Sample 6A was the control containing only the HDPE. In addition to the HDPE, Samples 6B and 6C also comprised 0.5% by weight and 1.5% by weight, respectively, of the masterbatch described in Example 5. The formulations were created by combining the base resin and masterbatches in a dry blend at the extrusion blow molding machine.

To evaluate the optimum cycle time between the control and the nucleated samples, each of the polymer compositions was processed under similar processing conditions with regimented decreasing blowing portions of the process. Bottles were evaluated for quality and process stability by a trained machine operator. As the cycle time was decreased, consistent defects caused by shortened cycle time appeared. The optimum cycle time was defined as the fastest cycle time that produced a consistent quality bottle typical of a production environment. Table 7 lists the different formulations evaluated and their cycle times.

TABLE 7

Compositions of Samples 6A-6C.

| Sample | Resin | Masterbatch (%) | Cycle time (sec) | Blowing time (sec) |
| --- | --- | --- | --- | --- |
| 6A | HDPE | 0 | 18.2 | 13 |
| 6B | HDPE | 0.5 | 16.7 | 11.5 |
| 6C | HDPE | 1.5 | 15.7 | 10.5 |

EXAMPLE 7

Five masterbatches (Samples 7A-7E) were produced using a twin-screw extruder. Each of the masterbatches comprised approximately 98% by weight of a commercially available polypropylene and approximately 2% by weight, with the exception of Sample 7D which contained 10% by weight, of a nucleating and/or clarifying agent. As the nucleating and/or clarifying agent, Sample 7A contained sodium benzoate, Sample 7B contained 2,2'-methylene-bis-(4,6-di-tert-butylphenyl)phosphate, Sample 7C contained disodium bicyclo[2.2.1]heptane-2,3-dicarboxylate, Sample 7D contained zinc glycolate, and Sample 7E contained the calcium salt of cis-hexahydrophthalic acid.

The samples were injection molded into 80 mil discs using a Husky S-90 injection-molding machine set at standard conditions. The discs were center gated single cavity discs with a diameter of 4 inches and nominal thickness of 0.080 inches.

The resulting discs were collected and submitted for crystallization temperature measurement using a Metler-Toledo MT822e DSC calibrated following manufacturer's recommendations. The peak crystallization temperature of the polymer, Tc, was measured using 20 mil thick sections of the polymer samples that were heated from 50° C. to 220° C. at 20° C./min, held for 2 min. at 220° C., and then cooled at 20° C./min to 50° C. For measurements of Tc using the 160° C. method, the 20 mil thick samples were heated from 50° C. to 160° C. at 20° C./min, held for 1 min. at 160° C., and then cooled at 20° C./min to 50° C. The results of these measurements are set forth in Table 8 below.

TABLE 8

Crystallization temperature measurements for Samples 7A-7E.

| Sample | Nucleator Loading (ppm) | Tc (° C.) | Tc (° C.) (160° C. method) |
| --- | --- | --- | --- |
| 7A | 500 | 115.9 | 119.5 |
| 7B | 500 | 115.9 | 119.3 |
| 7C | 500 | 117.3 | 120.0 |
| 7D | 500 | 113.8 | 117.0 |
| 7E | 400 | 117.3 | 119.5 |

As can be seen from the data set forth in Table 8 (using either DSC method), the peak crystallization temperatures of nucleated HDPE samples 7A-7C, 7E are significantly higher than the peak crystallization temperature of a standard virgin HDPE such as Sample 4A of Example 4. In addition, as demonstrated in the DSC results for Example 4, it appears that the polypropylene content in samples 7A-7E enhances the nucleation efficiency of the additives used in samples 7A-7E.

EXAMPLE 8

Four samples (Samples 8A-8D) were injection molded into 80 mil discs using a Husky S-90 injection-molding machine.

The discs are center gated single cavity discs with a diameter of 4 inches and nominal thickness of 0.080 inches. Each of the samples comprised a commercially available HDPE resin exhibiting a melt flow rate of approximately 19 g/10 min and a density of approximately 0.952 g/cm$^3$. Sample 8A was the control containing only the HDPE. Sample 8B and 8D included approximately 1% by weight of a commercially available phthalocyanine blue pigment in an LLDPE carrier, and Samples 8C and 8D included approximately 1% by weight of the masterbatch described in Example 5.

The peak crystallization temperature of the polymer, Tc, was measured using 20 mil thick polymer samples that were heated from 50° C. to 220° C. at 20° C./min, held for 2 min. at 220° C., and then cooled at 20° C./min to 50° C. For measurements of Tc using the 160° C. method, the 20 mil thick samples were heated from 50° C. to 160° C. at 20° C./min, held for 1 min. at 160° C., and then cooled at 20° C./min to 50° C.

TABLE 9

Crystallization temperatures for Samples 8A-8D.

| Sample | Tc (° C.) | Tc (° C.) (160° C. method) |
|---|---|---|
| 8A | 113.7 | — |
| 8B | 115.2 | 115.3 |
| 8C | 115.8 | 119.2 |
| 8D | 115.8 | 119.2 |

As can be seen from the data set forth in Table 9 (using either DSC method), the peak crystallization temperatures of nucleated HDPE samples 8B-8D are significantly higher than the peak crystallization temperature of the virgin HDPE Sample 8A. In addition, as demonstrated in the DSC results for Examples 4 and 7, it appears that the polypropylene content in samples 8C-8D enhances the nucleation efficiency of the additives used in samples 8C-8D.

Figure 1:
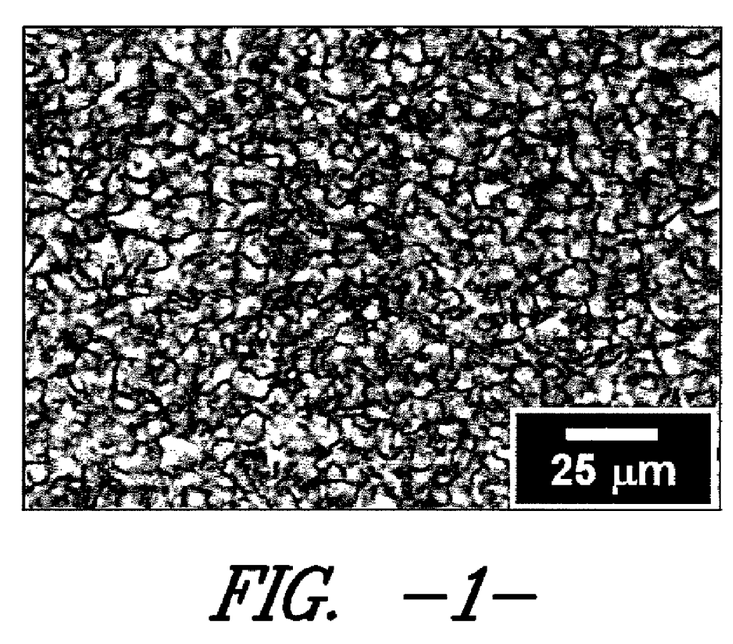
FIG. 1 shows a photograph of a sample of an injection molded high density polyethylene (HDPE) (sample 8A), made in accordance with the procedure in Example 8 herein.
Figure 2:
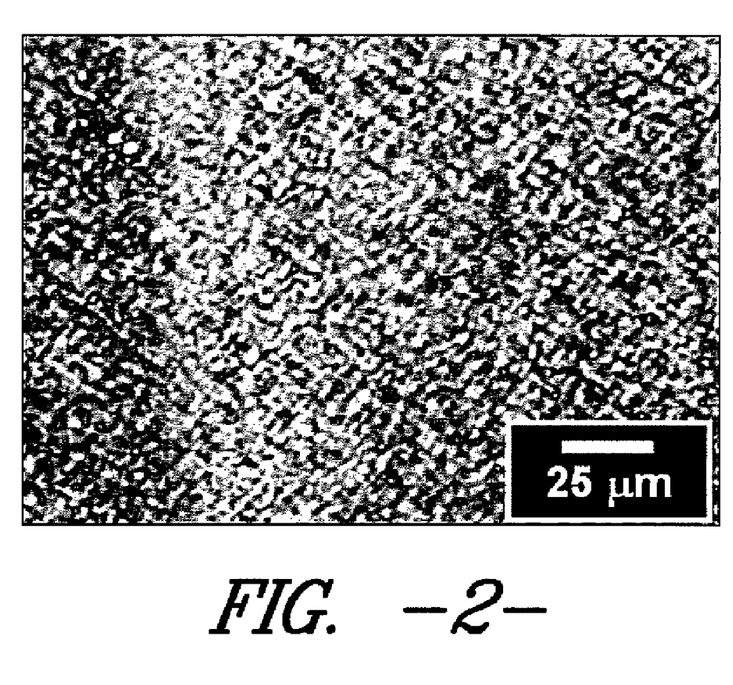
FIG. 2 shows a photograph of a sample of an injection molded HDPE (sample 8B), made in accordance with the procedure in Example 8 herein.
Figure 3:
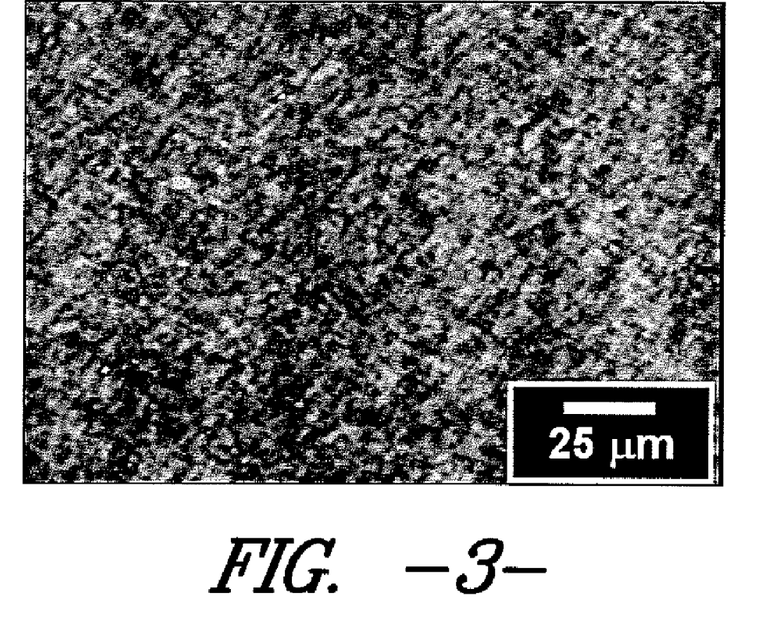
FIG. 3 shows a photograph of a sample of an injection molded HDPE (sample 8C), made in accordance with the procedure in Example 8 herein.
Figure 4:
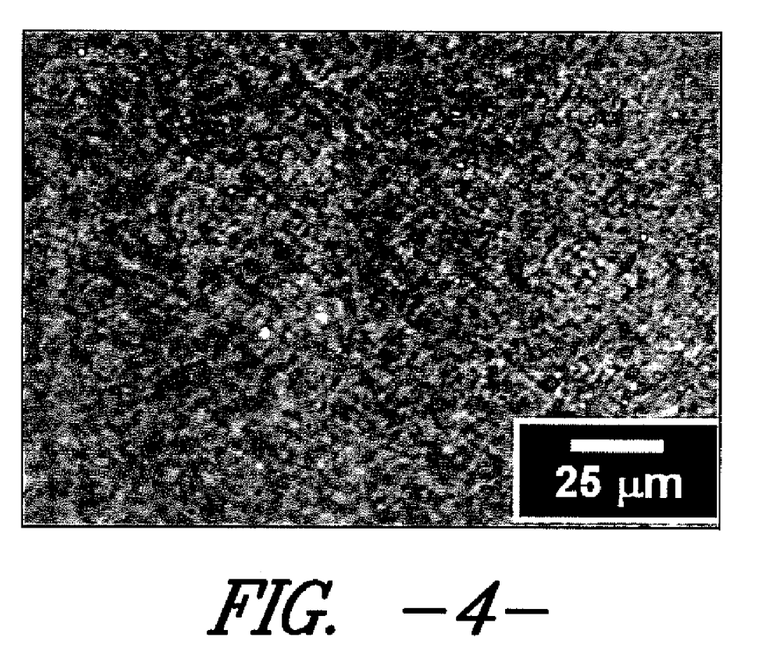
FIG. 4 is a photomicrograph of a sample of an injection molded HDPE (sample 8D), made in accordance with the procedure in Example 8 herein.

Discs were collected after injection molding of the samples and sectioned with a microtome to 10 microns thick. The resulting sections were examined using an optical microscope with crossed polarized filters. Micrographs of the sections from Samples 8A-8D are depicted, respectively, in FIGS. 1-4. As can be seen from the size scale of grainy features observed in the micrographs, the crystallites in Samples 8B-8D are smaller than the crystallites in Sample 8A, evidence for nucleation.

EXAMPLE 9

Six sets of cups (Samples 9A-9F) were produced using the same commercially available HDPE resin and Husky S-90 injection-molding machine described in Example 2. All of the polymer compositions used to produce the samples contained approximately 0.2% by weight of a commercially available 1,3:2,4-bis(3,4-dimethylbenzylidene) sorbitol nucleating agent. The polymer compositions used to produce the Samples 9B-9D included 2.0% by weight of a masterbatch comprising 2.5% by weight of an alkoxylated metatoluidine compound and 97.5% by weight of the HDPE resin. The improvements in optical properties are exhibited in Table 10.

TABLE 10

Optical properties of Samples 9A-9F.

| Sample | Co-additive | Loading of co-additive (ppm) | Haze (%) | Clarity (%) |
|---|---|---|---|---|
| 9A | — | 500 | 94.1 | 78.6 |
| 9B | m-toluidine 16EO 10PO | 500 | 54.0 | 96.8 |
| 9C | m-toluidine 2EO 10PO 6EO | 500 | 54.2 | 96.4 |
| 9D | m-toluidine 2EO 14PO 8EO | 500 | 54.2 | 96.6 |
| 9E | PEG 1000 | 500 | 58.8 | 96.1 |
| 9F | EP PO block copolymer | 500 | 55.6 | 96.7 |

EXAMPLE 10

A series of nucleators were formulated into a 0.25 Ml HDPE resin with a density of 0.963 g/cc. The samples were evaluated for extrusion blow molding cycle time improvements using a 350 ml bottle with a nominal part weight of 30 grams processed on a Bekum H-121 extrusion blow molding machine.

In addition to the sample nucleators, each sample received 500 ppm Irganox 1010 and 1000 ppm Irgafos 168 powder prior to compounding. The HPN-68L sample was introduced via 5% HPN-68L masterbatch in a 25 Ml LLDPE resin with a density of 0.917 g/cc.

Each resin was processed using typical production conditions. For each sample, the cycle time was systematically reduced by 0.5 seconds, allowed the process to stabilize, and assess bottles for quality. The recorded minimum cycle time was the lowest cycle time that consistently produced a quality bottle. When the cycle time was reduced too much, bottles demonstrated off quality warpage along the bottle body near the base. Table 11 highlights the minimum cycle time for each sample. Samples marked with "*" were material limited, further cycle reductions could not be evaluated. The cycle time of the nucleated samples was faster than the cycle time of the unnucleated control.

TABLE 11

Minimum cycle time for extrusion-blow molded HDPE bottles

| Resin | Nucleator | Loading (ppm) | Min. Cycle Time (sec) |
|---|---|---|---|
| HDPE | — | — | 12.0 |
| HDPE | MILLAD ® 3988 | 2500 | 10.8* |
| HDPE | MILLAD ® 3988 | 5000 | 10.8 |
| HDPE | 10% MILLAD ® 3988 masterbatch from Example 1 | | 10.0* |
| HDPE | calcium salt of cis-hexahydrophthalic acid | 1200 | 10.8 |
| HDPE | 5% HPN-68L masterbatch in PE | 1000 | 9.0 |

*samples were limited by resin amount. Data represents the minimum cycle time evaluated.

EXAMPLE 11

Cycle Time Reduction in EBM

A series of experiments were conducted on a WMB 4 100-16 extrusion blow-molding machine producing 1-liter HDPE bottles. The samples included a commercially available bimodal resin, a 0.30 g/10 min melt index HDPE with a density of 0.954 g/cc, combined with various nucleating agent concentrates. The concentrates were added as 2% by weight of the total amount of resin in the EBM experiment. The concentrates used in Example 11A-11E were based on a polypropylene homopolymer with a melt flow index of 3.5 g/10 minutes. Nucleating agents were present in a concentration of 2% by weight. Sample 11A contained sodium benzoate, Sample 11B contained sodium [2,2'-methylene-bis-(4,6-di-tert-butylphenyl)phosphate], Sample 11C contained aluminum hydroxy bis[2,2'-methylene-bis-(4,6-di-tert-butylphenyl)phosphate], Sample 11D contained the calcium salt of cis-hexahydrophthalic acid and Sample 11E contained disodium bicyclo[2.2.1]heptane-2,3-dicarboxylate. The concentrates used in Example 11F-11J were based on a bimodal high density polyethylene polymer with a melt index of 0.30 g/10 minutes and a density of 0.954 g/cc. Nucleating agents were present in a concentration of 2% on weight basis. Sample 11F contained sodium benzoate, Sample 11G contained sodium [2,2'-methylene-bis-(4,6-di-tert-butylphenyl)phosphate], Sample 11H contained aluminum hydroxy bis[2,2'-methylene-bis-(4,6-di-tert-butylphenyl)phosphate], Sample 11I contained the calcium salt of cis-hexahydrophthalic acid and Sample 11J contained disodium bicyclo[2.2.1]heptane-2,3-dicarboxylate.

To evaluate the optimum cycle time between the control and the nucleated samples, all resins were processed under similar processing conditions with regimented decreasing blowing portions of the process. Bottle diameters were measured by caliper on two heights on the bottles (bottom and top), parallel and perpendicular to the parting line. A second measure of quality for the bottle was the diameter of the neck of the bottle, parallel and perpendicular to the parting line.

The optimal cycle time was defined as the cycle time at which the bottle diameter was equal to the bottle diameter of the control material at the standard cycle time (i.e. 19.3 seconds) and had low deviation from a perfect circular shape. Table 12 lists the optimal cycle times determined from the bottle diameter and the reduction compared to the control material;

TABLE 12

Optimal cycle times and Cycle time reduction compared to control material, determined from the bottle diameter

| Sample | Optimal cycle time (s) | Cycle time reduction (%) |
| --- | --- | --- |
| control | 19.3 | — |
| 11A | 19.3 | 0.0 |
| 11B | 16.5 | 14.5 |
| 11C | 17.0 | 11.9 |
| 11D | 15.7 | 18.7 |
| 11E | 14.7 | 23.8 |

TABLE 12-continued

Optimal cycle times and Cycle time reduction compared to control material, determined from the bottle diameter

| Sample | Optimal cycle time (s) | Cycle time reduction (%) |
| --- | --- | --- |
| 11F | 18.8 | 2.6 |
| 11G | 16.8 | 13.0 |
| 11H | 16.8 | 13.0 |
| 11I | 14.2 | 26.4 |
| 11J | 15.7 | 18.7 |

It can be seen that many samples exhibited cycle time reduction. Further, the greatest reduction in cycle time percentage (%) was experienced by Samples 11D, 11E, 11I and 11J. Samples 11D and 11I, which showed particularly good and unexpected results, were samples that employed a calcium salt of hexahydrophthalic acid (i.e. Ca HHPA). Samples 11E and 11J employed Milliken & Company HPN-68L (disodium bicyclo[2.2.1]heptane-2,3-dicarboxylate).

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

The invention claimed is:

1. A composition comprising:
    (a) polyethylene selected from the group consisting of linear low density polyethylene, medium density polyethylene, high density polyethylene, and combinations thereof; and
    (b) a nucleated polyolefin, said nucleated polyolefin comprising polypropylene and a nucleating or clarifying agent, said nucleating or clarifying agent being selected from the group consisting of dicarboxylate metal salts, di-, tri-, and tetra-amides, and polyvinylcyclohexane; wherein said nucleated polyolefin is present in the composition in an amount of about 1,000 ppm to about 100,000 ppm based on the total weight of the composition.

2. A molded article of manufacture comprising the composition of claim 1.

3. The composition of claim 1 wherein said polyethylene is bimodal.

4. An article of manufacture comprising the composition of claim 1.

5. The article of claim 4, wherein said article is a film.

6. The article of claim 4, wherein said article comprises an extrusion blow molded container.

* * * * *